United States Patent Office 3,375,063
Patented Mar. 26, 1968

3,375,063
AMMONIUM POLYPHOSPHATE PREPARATION
John Bernard Bookey and Barrie Bernett Pearce, Norton-on-Tees, England, assignors to Imperial Chemical Industries Limited, London, England, a corporation of Great Britain
No Drawing. Filed Mar. 23, 1964, Ser. No. 354,103
Claims priority, application Great Britain,
Mar. 27, 1963, 12,192/63
8 Claims. (Cl. 23—107)

ABSTRACT OF THE DISCLOSURE

A process for producing ammonium polyphosphate by reacting wet process phosphoric acid and ammonia gas in the presence of ammonium polyphosphate and at a temperature of 170° to 250° C., whereby cooling is provided by the evaporation of water from the reaction zone, is disclosed.

---

This invention relates to ammonium phosphates.

According to the invention ammonium polyphosphate is produced continuously by feeding aqueous phosphoric acid containing from 45% to 60% of $P_2O_5$ by weight and ammonia gas to a body of liquid comprising ammonium polyphosphate maintained in a reaction zone at 170° C. to 250° C. whereby water is driven off and continuously withdrawing ammonium polyphosphate from the reaction zone.

It is preferred to operate the process autothermally, but if desired heat may be introduced to the system or may be removed from it by cooling.

By ammonium polyphosphate in this specification is meant a mixture comprising condensed phosphates, e.g. ammonium pyrophosphate, ammonium tripolyphosphate and/or higher polymers, together with some ammonium orthophospate. The mixture should contain at least 10% by weight of the pyrophosphate, tripolyphosphate and/or higher polymers, and at most 80% thereof. It is undesirable to have more than 80% of condensed phosphates, since such mixtures contain higher polymers than pyrophosphate which render the compositions liable to cake when exposed to damp air and confer high viscosity and so render them difficult to handle. At the lower end of the range are compositions such as 84% ammonium orthophosphate, 15% ammonium pyrophosphate, and 1% higher ammonium polyphosphates. At the upper end of the range are compositions such as 20% ammonium orthophosphate, 5% or more of ammonium pyrophosphate and 75% or less of higher polymers. These proportions are determined by analysis, X-ray diffraction and chromatography.

The preferred form of phosphoric acid is "wet process phosphoric acid" which has been concentrated by evaporation up to at least 45% $P_2O_5$ by weight, preferably about 55% $P_2O_5$ by weight. Wet process phosphoric acid is phosphoric acid made by reacting phosphate rock with aqueous sulphuric acid or mixed sulphuric acid/ammonium sulphate. It contains up to about 30% to 35% $P_2O_5$ as made. Concentration above 55% $P_2O_5$ is awkward because special constructional materials are needed.

It is an advantage of the invention that the process once started may be operated autothermally. Hence, the heat of reaction is almost fully utilized in evaporating off water and in producing by condensation polyphosphates in substantially dry form. The process thus has considerable operating cost advantage over prior processes such as those using superphosphoric acid which must be controlled by water cooling.

The process may be conducted, for example, by introducing initially a mixture of phosphoric acid containing at least 45% $P_2O_5$ and solid mon-ammonium phosphate e.g. a 50:50 mixture by weight into a reaction zone at atmospheric pressure, and then passing in wet process phosphoric acid containing at least 45% $P_2O_5$ and ammonia, which may be led in through a sparger, continuously in the desired proportions until the temperature is steady at 170° C. to 230° C. (depending on the initial $P_2O_5$ concentration and the degree of reaction) and then commencing to take off ammonium polyphosphate at the same rate. In this process it may be desirable to use external heating initially. The object of introducing mon-ammonium phosphate to begin with is to raise the boiling point of the reaction mixture. This may also be done by introducing some ammonium sulphate initially.

Alternatively, heating may be applied to the reaction product of wet process phosphoric acid containing at least 45% $P_2O_5$ and ammonia contained in a suitable vessel until the temperature of the bath is about 200° C. when steady evolution of water occurs. The process is then conducted autothermally by feeding wet process phosphoric acid of at least 45% $P_2O_5$ content and ammonia continuously to the vessel and taking off ammonium polyphosphate continuously.

It is an advantage of the present process that by its use the difficulties of solidification and choking are much decreased. This is facilitated by including mon-ammonium phosphate in the initial reaction mixture.

The ammonium polyphosphate so obtained may have an $N:P_2O_5$ ratio e.g. in the range of about 11.5:65.0 to 16:55 and comprise the various components already indicated. It is substantially anhydrous but may contain up to about 0.3% water by weight. When cooled it is obtained as a glass, which is not convenient for some uses. It is therefore preferred to convert it into substantially crystalline form by passing it while molten into a powerful mixing device such as a blunger or paddle mixer and mixing it there with previously obtained crystals.

If desired, the crystals may be coated, but may also be directly stored in the uncoated condition in polythene bags such as those sold under the registered trade mark "Polisax."

As above described the process is operated at atmospheric pressure. A typical product when so produced has the composition by weight:

|  | Percent |
|---|---|
| N | 11.8 |
| $P_2O_5$ | 61.2 |

However, the process may also be operated at pressures above atmospheric e.g. in a countercurrent column reactor up to 200 pounds per square inch gauge and then yields, with a much reduced residence time, products substantially the same as before. Higher pressures than 100 p.s.i.g. have the disadvantage that as the pressure rises it becomes increasingly difficult to remove the water from the system as steam.

Advantages of the ammonium polyphosphates as herein claimed are: N:P ratios up to e.g. 15:58; their relatively low melting points; their ability to furnish completely anhydrous melts; their ability to complex heavy metal ions and prevent precipitation of phosphates in liquid fertilizers.

Example 1

0.5 kg. of aqueous phosphorica acid (50% $P_2O_5$) was introduced into a stirred reactor and rapidly ammoniated with ammonia gas, the temperature attaining about 170° C. Wet process phosphoric acid (50% $P_2O_5$) was then added continuously at about 1700 gms./hour and ammonia gas was introduced at the bottom of the vessel at a rate of 160 gms./hour. Using a residence time of one hour there was obtained 1 kg. per hour of ammonium polyphosphate as a melt containing about 0.2% $H_2O$ and having an $N:P_2O_5$ ratio of 16:57.4.

Operating similarly at 200° C. there was obtained a melt containing 0.1% $H_2O$ and having an $N:P_2O_5$ ratio of 14.0:57.7.

A similar material made by operating at 187° C. had an $N:P_2O_5$ ratio of 15.5:55.5 and a pH in aqueous solution of 6.6. Its sequestering effect in relation to metal ions was tested as follows. A sample of wet process phosphoric acid (50% $P_2O_5$) and one comprising the same acid plus 30% by weight of the above condensed phosphate were each titrated to a pH of 8. The first yielded a heavy precipitate of insoluble metal phosphates, the second yielded a faint precipitate. This brings out the chelating effect of the polyphosphate.

*Example 2*

The acid used had a 56% $P_2O_5$ content. The process was operated in similar manner to Example 1 using a reaction temperature of 200° C. When the process was running smoothly there was taken off per hour 1 kg. of a substantially dry ammonium polyphosphate melt having an $N:P_2O_5$ ratio, of 15:57. This had a content of about 15% of pyrophosphate and contained a small amount of higher phosphates.

*Example 3*

Pure aqueous phosphoric acid (55% $P_2O_5$) was passed into the top of a stainless steel column, 1" diam. x 18" long, packed with stainless steel turnings at a rate of about 1000 gms. per hour and an excess of ammonia gas at 170 p.s.i.g. was passed countercurrently through the system from near the bottom of the column. The reaction temperature became steady at 220° C. Product in the form of a melt was drawn off from the foot of the column below the ammonia inlet at a rate of about 600 gms. per hour. The material had an $N:P_2O_5$ ratio of 14.1:64.3 (N:P 1.1:1) and contained 61% ammonium orthophosphate, 31% ammonium pyrophosphate, and 8% of ammonium polyphosphate.

We claim:

1. A process for producing ammonium polyphosphate mixtures consisting essentially of ammonium orthophosphate and about 10 to 80% by weight of ammonium pyrophosphate, tripolyphosphate and/or higher phosphate polymers, said process comprising feeding aqueous phosphoric acid containing from about 45 to 56% of $P_2O_5$ by weight and ammonia gas to a body of liquid consisting essentially of ammonium polyphosphate maintained in a reaction zone at 170° C. to 250° C., reacting the said phosphoric acid and said ammonia gas while operating the process in a substantially autothermal manner with the removal of evaporated water from the reaction zone, controlling the composition of the product by controlling the residence time in the reaction zone, and continuously withdrawing ammonium polyphosphate from the reaction zone as a melt, and thereafter crystallizing the ammonium polyphosphate.

2. The process as claimed in claim 1 in which the aqueous phosphoric acid is wet process phosphoric acid which has been concentrated.

3. The process as claimed in claim 1 in which the reaction temperature is within the range of 170° C. to 230° C.

4. The process as claimed in claim 1 in which the process is operated at atmospheric pressure.

5. The process as claimed in claim 1 in which the process is operated at superatmospheric pressure.

6. The process as claimed in claim 5 in which the said superatmospheric pressure is at most 100 pounds per square inch gauge.

7. The process as claimed in claim 1, wherein the process is begun by introducing a mixture of solid monammonium phosphate and phosphoric acid containing from about 45 to 56% $P_2O_5$ by weight into the reaction zone and then passing in ammonia and wet process phosphoric acid containing about 45 to 56% $P_2O_5$ by weight continuously and, when the temperature attains 170° C. to 230° C., maintaining it thereat autothermically while removing ammonium polyphosphate continuously from the reaction zone.

8. The process as claimed in claim 1 wherein the process is begun by heating the reaction product of ammonia and wet process phosphoric acid containing 45 to 56% $P_2O_5$ by weight until the temperature of the mixture attains 170° C. to 230° C., and thereafter continuously feeding ammonia and wet process phosphoric acid containing 45 to 56% $P_2O_5$ by weight to the reaction zone to maintain said temperature autothermically, and continuously removing ammonium polyphosphate.

References Cited

UNITED STATES PATENTS

| | | | |
|---|---|---|---|
| 3,015,552 | 1/1962 | Striplin et al. | 23—107 X |
| 3,044,851 | 7/1962 | Young | 23—107 |
| 3,057,711 | 10/1962 | Reusser et al. | 23—107 X |
| 3,171,733 | 3/1965 | Hignett et al. | 71—48 |

OSCAR R. VERTIZ, *Primary Examiner.*

O. F. CRUTCHFIELD, L. A. MARSH,
*Assistant Examiners.*